US007227734B2

(12) United States Patent
Chu

(10) Patent No.: US 7,227,734 B2
(45) Date of Patent: Jun. 5, 2007

(54) ESD PROTECTION DEVICE, AND PUSHBUTTON MODULE AND ELECTRONIC DEVICE UTILIZING THE SAME

(75) Inventor: Yao-Wen Chu, Taoyuan (TW)

(73) Assignee: BENQ Corporation, Taoyuan (TW)

( * ) Notice: Subject to any disclaimer, the term of this patent is extended or adjusted under 35 U.S.C. 154(b) by 505 days.

(21) Appl. No.: 10/869,716

(22) Filed: Jun. 16, 2004

(65) Prior Publication Data

US 2004/0257727 A1 Dec. 23, 2004

(30) Foreign Application Priority Data

Jun. 23, 2003 (TW) ............................... 92116935 A

(51) Int. Cl.
*H02H 1/00* (2006.01)

(52) U.S. Cl. ...................................................... 361/212

(58) Field of Classification Search ................. 361/212
See application file for complete search history.

(56) References Cited

U.S. PATENT DOCUMENTS 5,063,474 A * 11/1991 Igarashi ...................... 361/220

* cited by examiner

*Primary Examiner*—Ronald W. Leja
(74) *Attorney, Agent, or Firm*—Quintero Law Office

(57) ABSTRACT

An electrostatic discharge (ESD) protection device for a pushbutton module. A printed circuit board (PCB), a keypad unit, and a keypad marking board as well as an insulating sleeve and an electrical conductivity board isolate and discharge generated static electricity.

18 Claims, 3 Drawing Sheets

ESD PROTECTION DEVICE, AND PUSHBUTTON MODULE AND ELECTRONIC DEVICE UTILIZING THE SAME

BACKGROUND OF THE INVENTION

1. Field of the Invention

The present invention relates to an electrostatic discharge (ESD) protection device, and more specifically, to an ESD protection device for a pushbutton module.

2. Description of the Related Art

Electrostatic discharge (ESD) occurs in device measurement, packaging, installation, and usage, often damaging integrated circuits (IC) and affecting functionality. Three common models illustrating the formation of ESD are human body model, machine model, and charge device model. The human body model describes the ESD effect induced when the pin of an IC is contacted by a human being carrying electrostatic energy, defined according to Method 3015.6 of Military Standard (MIL-STD.-883). The machine model describes ESD induced when the pin of an IC is contacted by a machine carrying electrostatic energy, defined according to the measurement method in Method 20 of the Electronic Industry Association of Japan (EIAJ-IC-121) standard. The charge device model describes an ESD pulse generated in a charge carrying IC when contacting a grounded conductive element.

Most electronic devices experience ESD during 99% of their life cycle, and ESD interference in an electronic device can cause device lock up, restart, data loss, and reduced in reliability. ESD can seriously damage I/O ports, resulting in hardware breakdown and component damage.

Component failure is an obvious symptom of ESD damage, wherein contact with sensitive components destroys the components or microcircuits thereof. Although the electronic components subject to electrostatic discharge often suffer insignificant damage, the degradation of the middle layer is a potential issue as the expected lifetime of the component is less than claimed. ESD damage can accumulate, such that the performance of the influenced component varies from use to use. Another key effect of ESD is the influence on operation. The ESD generated energy can be mistakenly collected by the operating device as valid data, resulting in temporary failure during data transmission, or more seriously, physical damage to the device, such as damage to electronic components in a pushbutton module.

Push button switches are currently widely used, but the discussed ESD problems are is still an issue. In order to prevent electrostatic accumulation, an appropriate approach is required for avoidance of ESD generation.

SUMMARY OF THE INVENTION

Accordingly, an object of the present invention is to provide an electrostatic discharge (ESD) protection device for a pushbutton module.

The present invention provides an electrostatic protection device for a pushbutton module comprising at least a printed circuit board (PCB), a keypad unit, and a keypad marking board. The keypad unit configured on the PCB comprises a first portion and a second portion, wherein the second portion passes through and protrudes from the keypad marking board.

The electrostatic protection device comprises an insulating sleeve and an electrical conductivity board, wherein the insulating sleeve installed between the keypad unit and the PCB to enclose the first portion of the keypad unit for isolation of static electricity induced therein. The isolating characteristic of the insulating sleeve prevents static electricity induced in the keypad unit from damaging electronic components on the PCB.

The electrical conductivity board between the PCB and the keypad marking board provides the shortest discharge path for the pushbutton module. The electrical conductivity board comprises at least a opening for the second keypad portion to pass through. In the event of static electricity induced in the pushbutton module due to keypad unit contact, the electrical conductivity board discharges the static electricity to a reference ground, avoiding system or device failure.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
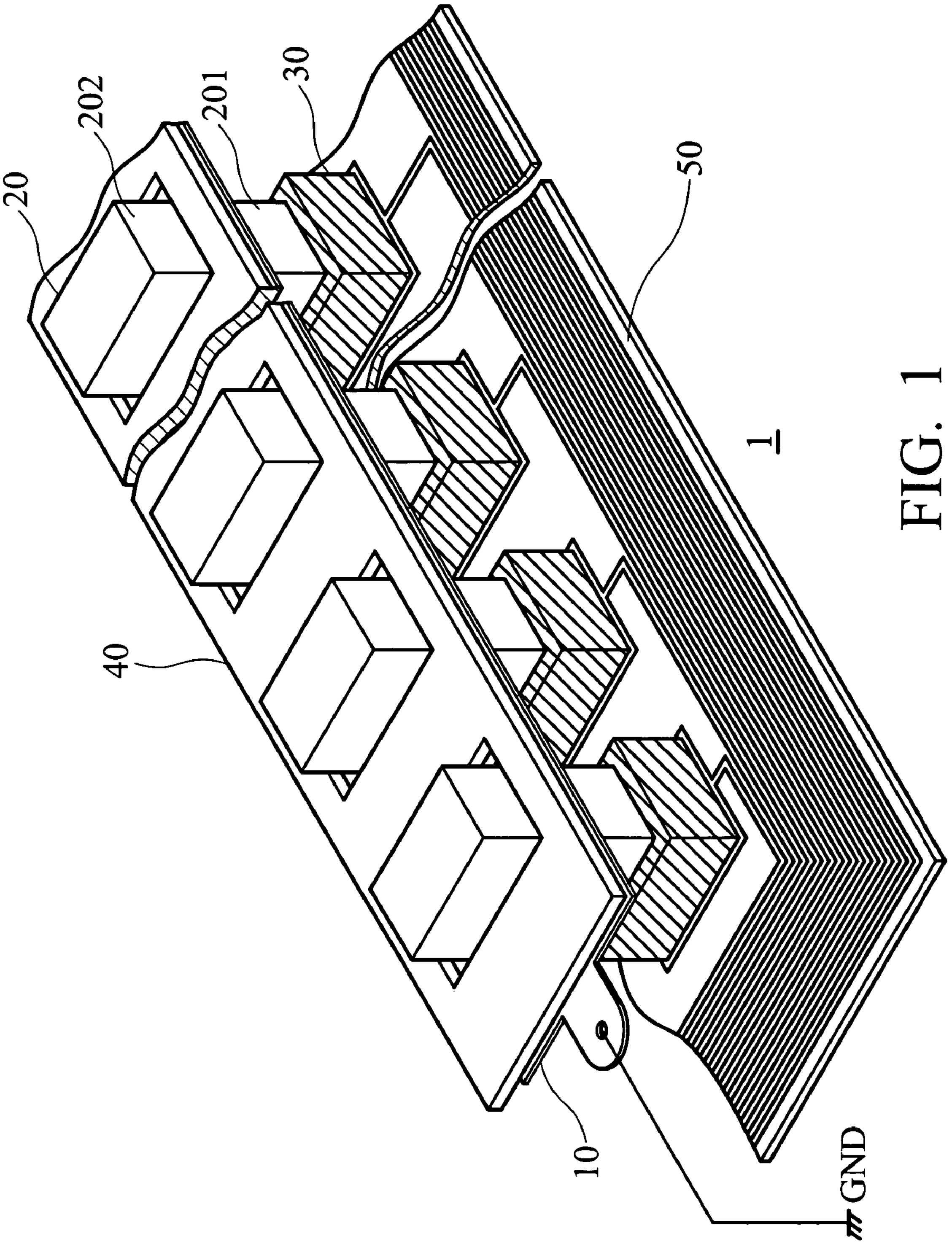
FIG. 1 illustrates an electrostatic discharge-resistant pushbutton module according to the present invention.

FIG. 1 illustrates an electrostatic discharge capable pushbutton module according to the present invention. As shown in FIG. 1, an insulating sleeve 30 disposed between a keypad unit 20 and a printed circuit board (PCB) 50 encloses an insulated portion 201 of the keypad unit 20. An electrical conductivity board 10 is disposed between the PCB 50 and a keypad marking board. The keypad unit 20 also comprises an exposed portion 202 not enclosed by the insulating sleeve 30. The electrical conductivity board 10 comprises at least one opening through which portion 202 passes.

Operation of the pushbutton module disclosed in the present invention is described as follows. The insulating sleeve 30 between the keypad unit 20 and the PCB 50 encloses the insulated portion 201 of the keypad unit 20, to isolate static electricity induced in the keypad unit 20. An electrical conductivity board 10 between the PCB 50 and the keypad marking board 40 diverts static electricity to a reference ground GND. The electrical conductivity board 10 comprises at least one opening for the exposed portion 202 of the keypad unit 20 to pass through and protrude from the keypad marking board 40.

Figure 2:
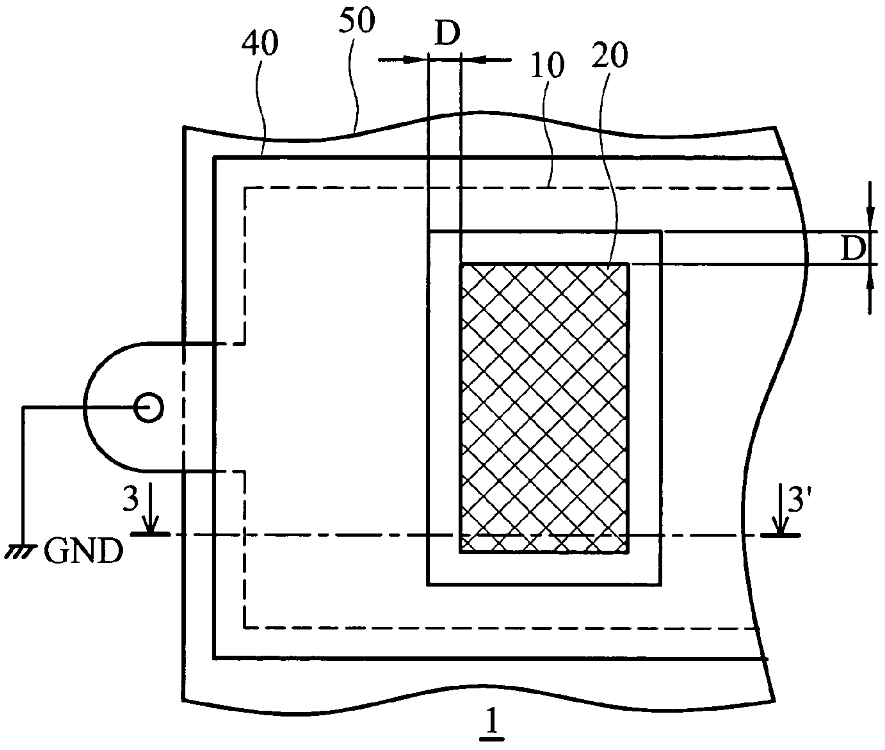
FIG. 2 is a top view of an electrostatic discharge-resistant pushbutton module according to the present invention.
Figure 3:
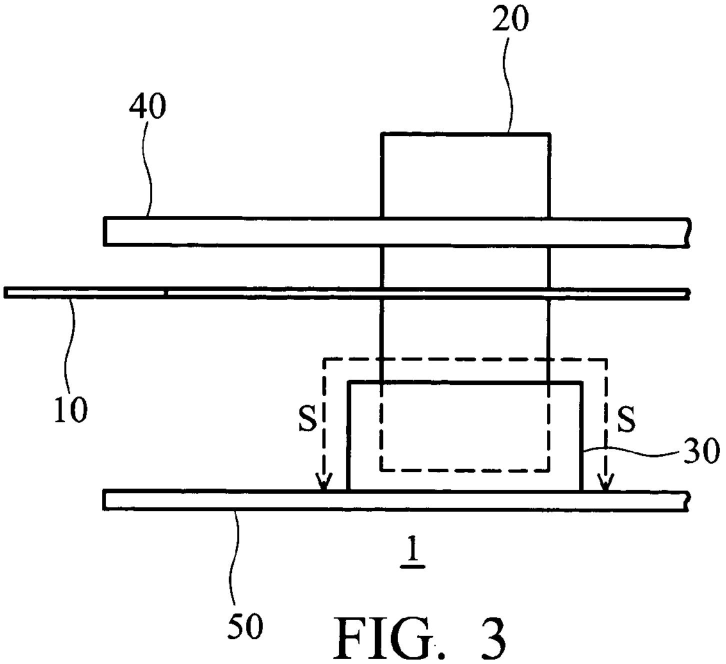
FIG. 3 is a side view of an electrostatic discharge-resistant pushbutton module according to the present invention.

FIG. 2 is the top view of the pushbutton module 1, and FIG. 3 is a side view along the 3-3' direction of the pushbutton module 1. As shown in FIG. 2, the opening in the electrical conductivity board 10 has an inner margin. A gap D between the inner margin and the keypad unit 20 is less than 1 mm. As shown in FIG. 3, the insulating sleeve 30 has a rim spacing S, wider than gap D, for example, two or more times wider than the gap D.

Contact with the keypad unit 20 can generate static electricity on the keypad unit 20. The insulating sleeve 30 thus isolates the PCB 50 from static electricity on the keypad unit 20. Furthermore, since the gap D between the inner margin of the opening on the electrical conductivity board 10 and the keypad unit 20 is less than 1 mm, and the rim spacing S of the insulating sleeve 30 more than twice the gap D, static electricity thus discharges along the electrical conductivity board 10 to a reference ground GND or frame ground, that is, along the shortest path available. Various electronic devices, such as mobile phones, LCD monitors, and personal digital assistants (PDAS), can implement the disclosed device.

Figure 4:
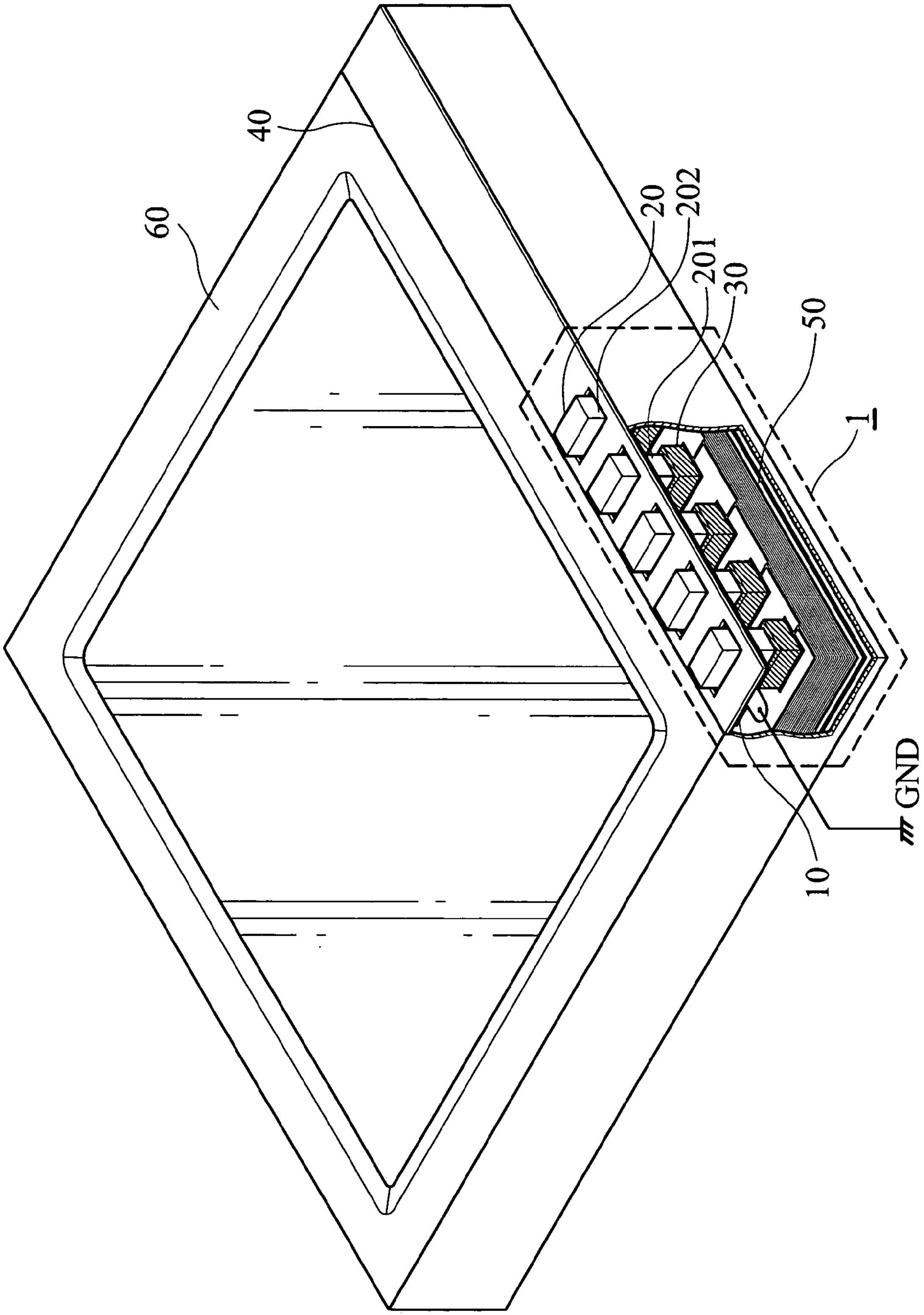
FIG. 4 illustrates a liquid crystal display (LCD) utilizing an electrostatic discharge-resistant pushbutton module according to the present invention.

FIG. 4 illustrates an LCD 60 utilizing an electrostatic discharge protection pushbutton module according to the present invention, the pushbutton module comprising a PCB 50 controlling the LCD 60, a keypad unit 20 receiving and relaying user commands to the PCB 50, and a keypad marking board 40 indicating control actions for the keypad unit 20. An insulating sleeve 30 between the keypad unit 20 and the PCB 50 encloses the insulated portion 201 of the keypad unit 20 for isolation of static electricity generated therein. An electrical conductivity board 10 between the PCB 50 and the keypad marking board 40 comprises at least one opening for the exposed portion 202 of the keypad unit 20 to pass through.

The opening of the electrical conductivity board 10 has an inner margin separated from the keypad unit 20 be a gap D less than 1 mm. The rim spacing S of the insulating sleeve 30 must be wider than the gap D, for example, two or more times wider than the gap D. Static electricity generated on the keypad unit 20, since the rim spacing S of the insulating sleeve 30 is twice that of spacing D, is directed to the reference ground GND through the electrical conductivity board 10. The electrical conductivity board installed in the LCD 60 provides the shortest possible discharge path, preventing breakdown and component failure due to electrostatic discharge from the pushbutton module 1.

To conclude, the present inventions implementation of an insulating sleeve between the PCB and the keypad unit to enclose isolates static electricity on the keypad unit from the PCB. The present invention also provides an electrical conductivity board to establish a shortest discharge path for the keypad unit. Implementation of the present invention is inexpensive since the only an additional insulating sleeve and electrical conductivity board are required, thereby solving the static electricity issue economically.

Finally, while the invention has been described by way of example and in terms of the above, it is to be understood that the invention is not limited to the disclosed embodiment. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An electrostatic protection device for a pushbutton module, comprising at least a printed circuit board (PCB), a keypad unit, and a keypad marking board, the keypad unit passes and protrudes from the keypad marking board, the electrostatic protection device comprising:

an insulating sleeve, configured between the keypad unit and the PCB to enclose a portion of the keypad unit for isolating static electricity induced in the keypad unit; and an electrical conductivity board, configured between the PCB and the keypad marking board, wherein the electrical conductivity board comprises at least one opening through which another keypad portion passes, such that when static electricity is generated in the pushbutton module, the electrical conductivity board discharges the static electricity;

wherein the opening of the electrical conductivity board comprises an inner margin, with a gap between the inner margin and the keypad unit.

2. The electrostatic protection device according to claim 1, wherein the electrical conductivity board is coupled to a reference ground for discharge of static electricity.

3. The electrostatic protection device according to claim 2, wherein the reference ground is a frame ground.

4. The electrostatic protection device according to claim 1, wherein the gap is less than 1 mm.

5. The electrostatic protection device according to claim 1, wherein the insulating sleeve comprises a rim spacing greater than the gap between the inner margin and the keypad unit.

6. The electrostatic protection device according to claim 5, wherein the rim spacing of the insulating sleeve is at least twice the gap between the inner margin and the keypad unit.

7. An electrostatic discharge capable pushbutton module comprising:

a printed circuit board (PCB);

a keypad unit;

a keypad marking board, passing through and protruding from the keypad marking board;

an insulating sleeve between the keypad unit and the PCB to enclose a portion of the keypad unit for isolating static electricity induced in the keypad unit; and an electrical conductivity board between the PCB and the keypad marking board, comprising at least one opening through which another keypad portion passes, such that when static electricity is generated in the pushbutton module, the electrical conductivity board discharges the static electricity;

wherein the opening of the electrical conductivity board comprises an inner margin, with a gap between the inner margin and the keypad unit.

8. The pushbutton module according to claim 7, wherein the electrical conductivity board is coupled to a reference ground for discharge of the static electricity.

9. The pushbutton module according to claim 8, the reference ground is a frame ground.

10. The pushbutton module according to claim 7, wherein the gap is less than 1 mm.

11. The pushbutton module according to claim 7, wherein the insulating sleeve comprises a rim spacing greater than the gap between the inner margin and the keypad unit.

12. The pushbutton module according to claim 11, wherein the rim spacing of the insulating sleeve is at least twice the gap between the inner margin and the keypad unit.

13. An electronic device comprising at least an electrostatic discharge-resistant pushbutton module, the electronic device comprising:

a main body;

a pushbutton module, configured in the main body and comprising at least a printed circuit board (PCB), a keypad unit, and a keypad marking board, wherein the keypad unit passes and protrudes from the keypad marking board;

an insulating sleeve between the keypad unit and the PCB to enclose a portion of the keypad unit for isolating static electricity induced in the keypad unit; and an electrical conductivity board between the PCB and the keypad marking board, wherein the electrical conductivity board comprises at least one opening through which another keypad portion passes, such that when static electricity is generated in the pushbutton module, the electrical conductivity board discharges the static electricity;

wherein the opening of the electrical conductivity board comprises an inner margin, with a gap between the inner margin and the keypad unit.

14. The electronic device according to claim 13, wherein the electrical conductivity board is coupled to a reference ground for discharge of the static electricity.

15. The electronic device according to claim 14, wherein the reference ground is a frame ground.

16. The electronic device according to claim 13, wherein the gap is less than 1 mm.

17. The electronic device according to claim 13, wherein the insulating sleeve comprises a rim spacing greater than the gap between the inner margin and the keypad unit.

18. The electronic device according to claim 17, wherein the rim spacing of the insulating sleeve is at least twice the gap between the inner margin and the keypad unit.

* * * * *